United States Patent
Ho et al.

(10) Patent No.: US 11,048,314 B2
(45) Date of Patent: Jun. 29, 2021

(54) SYSTEM LOADING DETECTING DEVICE AND METHOD

(71) Applicant: Quanta Computer Inc., Taoyuan (TW)

(72) Inventors: Ming-Tsung Ho, Taoyuan (TW); Chun-Jie Yu, Taoyuan (TW); Yu-An Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 95 days.

(21) Appl. No.: 16/410,220

(22) Filed: May 13, 2019

(65) Prior Publication Data

US 2020/0142467 A1    May 7, 2020

(30) Foreign Application Priority Data

Nov. 5, 2018 (TW) .................................. 107139096

(51) Int. Cl.
| | |
|---|---|
| *G06F 1/3206* | (2019.01) |
| *G06F 1/08* | (2006.01) |
| *G06F 1/3296* | (2019.01) |
| *G06F 1/324* | (2019.01) |
| *G06F 1/26* | (2006.01) |
| *G06F 1/3212* | (2019.01) |

(Continued)

(52) U.S. Cl.
CPC .............. *G06F 1/3206* (2013.01); *G06F 1/08* (2013.01); *G06F 1/324* (2013.01); *G06F 1/3296* (2013.01); *G06F 1/263* (2013.01); *G06F 1/30* (2013.01); *G06F 1/3203* (2013.01); *G06F 1/3212* (2013.01); *Y02D 10/00* (2018.01)

(58) Field of Classification Search
CPC .......... G06F 1/3206; G06F 1/08; G06F 1/324; G06F 1/3296; G06F 1/3203; G06F 1/263; G06F 1/3212; G06F 1/30; Y02D 10/00
USPC ........................................ 713/300, 320, 322
See application file for complete search history.

(56) References Cited

U.S. PATENT DOCUMENTS

| | | |
|---|---|---|
| 5,167,024 A | 11/1992 | Smith et al. |
| 6,147,521 A | 11/2000 | Degoirat et al. |

(Continued)

FOREIGN PATENT DOCUMENTS

TW    201248378 A    12/2012

OTHER PUBLICATIONS

Taiwan Office Action dated May 15, 2019 in Taiwan Application No. 107139096.

(Continued)

*Primary Examiner* — Ji H Bae
(74) *Attorney, Agent, or Firm* — McClure, Qualey & Rodack, LLP

(57) ABSTRACT

A system loading detecting device and method are provided. The system loading detecting device includes a processing device, a detection circuit and a controller. The detection circuit detects whether an adapter is unplugged from the system loading detecting device to generate a detection signal. When the adapter is unplugged from the system loading detecting device, the detection signal is changed from a first level to a second level. The controller is coupled to the detection circuit and the processing device. In addition, the controller receives the detection signal and determines whether to trigger the generation of a throttling signal according to the detection signal to enable a throttling mechanism to reduce system loading.

6 Claims, 8 Drawing Sheets

(51) Int. Cl.
*G06F 1/30* (2006.01)
*G06F 1/3203* (2019.01)

(56) References Cited

U.S. PATENT DOCUMENTS

| | | | |
|---|---|---|---|
| 7,543,167 B2* | 6/2009 | Nakano | G06F 1/3203 |
| | | | 713/320 |
| 8,762,757 B2 | 6/2014 | Chen et al. | |
| 2002/0097022 A1* | 7/2002 | Saeki | H02J 7/045 |
| | | | 320/125 |
| 2002/0152417 A1* | 10/2002 | Nguyen | G06F 1/30 |
| | | | 714/10 |
| 2004/0236969 A1* | 11/2004 | Lippert | G06F 1/30 |
| | | | 713/300 |
| 2013/0232357 A1* | 9/2013 | Nagata | G06F 1/206 |
| | | | 713/322 |
| 2014/0008984 A1* | 1/2014 | Kamiyama | H02J 9/06 |
| | | | 307/64 |
| 2014/0229748 A1* | 8/2014 | Li | G06F 1/30 |
| | | | 713/300 |

OTHER PUBLICATIONS

Search Report issued in Taiwan Office Action dated May 15, 2019 in Taiwan Application No. 107139096.

* cited by examiner

100

SYSTEM LOADING DETECTING DEVICE AND METHOD

CROSS REFERENCE TO RELATED APPLICATIONS

This application claims priority of Taiwan Patent Application No. 107139096, filed on Nov. 5, 2018, the entirety of which is incorporated by reference herein.

BACKGROUND OF THE INVENTION

Field of the Invention

The invention generally relates to a system loading detecting technology, and more particularly, to system loading detecting technology for using a detection circuit to detect whether an adapter has been unplugged.

Description of the Related Art

When a notebook system needs to be operated at full speed, more power is required in order to handle higher loading requirements. For example, as computer technology has progressed, the central processing units (CPU) and graphics processing units (GPU) of current notebook computers may have some high-power performance functions which may allow the operation power of the CPU and GPU to be higher than the Thermal Design Power. One of the power performance functions is the dynamic overclocking function (which can also be called a high-power mode or turbo boost mode). The dynamic overclocking function may allow the CPU and GPU to be operated at frequencies that are over the normal operation frequency.

Generally speaking, when a notebook is plugged into an adaptor, for the current standard of the adaptor, the adaptor can provide enough power for a system operating at full speed. However, when the adaptor is unplugged from the notebook (i.e. the power is provided by the battery of the notebook), due to the limitations of the power density of the battery material of the battery of the notebook and the limitations of the space available in the notebook, the battery of the notebook may not provide enough power for the system to operate at full speed.

For example, when power of the system is from the adapter and the system is operated at full speed in an AC operation mode, if the adaptor is unplugged from the notebook, the system will change to obtain the power from the battery of the notebook (i.e. enter a DC operation mode) for the full speed operation. When the system is switched from the AC operation mode to the DC operation mode, the system may be shut down due to the power shortage. Therefore, how to avoid the system shut down and avoid the battery overload is a subject worthy of discussion.

BRIEF SUMMARY OF THE INVENTION

A system loading detecting device and method are provided to overcome the problems mentioned above.

An embodiment of the invention provides a system loading detecting device. The system loading detecting device comprises a processing device, a detection circuit and a controller. The detection circuit detects whether an adapter is unplugged from the system loading detecting device to generate a detection signal. When the adapter is unplugged from the system loading detecting device, the detection signal is changed from a first level to a second level. The controller is coupled to the detection circuit and the processing device. In addition, the controller receives the detection signal and determines whether to trigger the generation of a throttling signal according to the detection signal to enable a throttling mechanism to reduce system loading.

In some embodiments of the invention, the detection circuit further comprises a first resistor, a second resistor and a comparator. The comparator is coupled to the first resistor and the second resistor. The comparator compares a divided voltage generated through the first resistor and the second resistor to a reference voltage to generate the detection signal.

In some embodiments of the invention, the detection circuit further comprises a third resistor, a fourth resistor, an ID pin connection end and a switch. The switch is coupled to the third resistor, the fourth resistor and the ID pin connection end. The comparator is coupled to the switch at an end point. When the switch is disabled, the comparator compares the divided voltage generated through the first resistor and the second resistor to the reference voltage to generate the detection signal.

An embodiment of the invention provides a system loading detecting method. The system loading detecting method is applied to a system loading detecting device. The system loading detecting method comprises the steps of using a detection circuit of the system loading detecting device to detect whether an adapter is unplugged from the system loading detecting device to generate a detection signal; using a controller of the system loading detecting device to receive the detection signal; and determining whether to trigger the generation of a throttling signal according to the detection signal to enable a throttling mechanism to reduce system loading. When the adapter is unplugged from the system loading detecting device, the detection signal is changed from a first level to a second level.

Other aspects and features of the invention will become apparent to those with ordinary skill in the art upon review of the following descriptions of specific embodiments of system loading detecting devices and methods.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
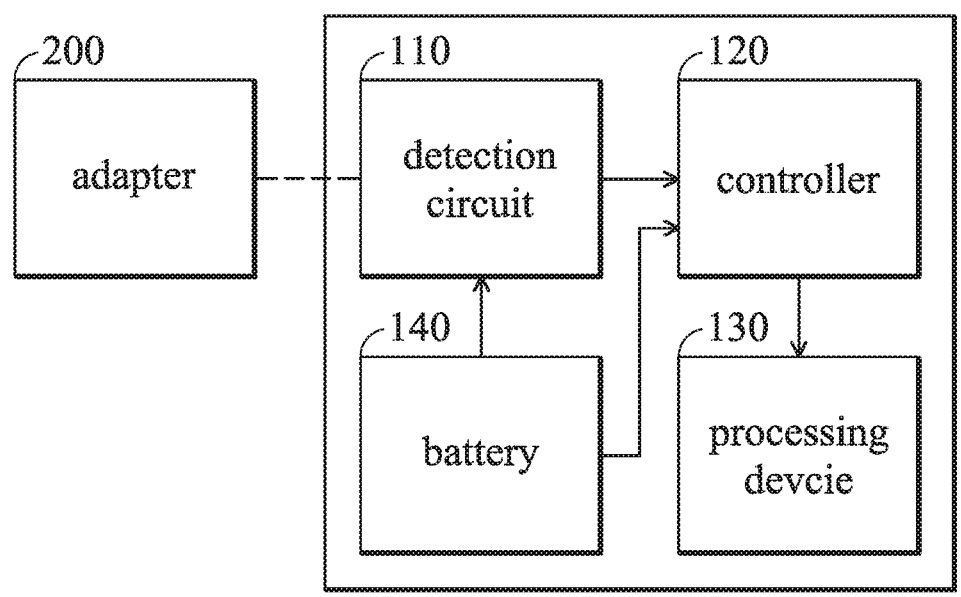
FIG. 1 is a block diagram of a system loading detecting device 100 according to an embodiment of the invention.

FIG. 1 is a block diagram of a system loading detecting device 100 according to an embodiment of the invention. According to an embodiment of the invention, the system loading detecting device 100 may be a notebook, but the invention should not be limited thereto. As shown in FIG. 1, the system loading detecting device 100 may comprise a detection circuit 110, a controller 120, a processing device 130 and a battery 140. It should be noted that, in order to clarify the concept of the invention, FIG. 1 presents a simplified block diagram in which only the elements relevant to the invention are shown. However, the invention should not be limited to what is shown in FIG. 1. The system loading detecting device 100 may comprise other elements.

Figure 4:
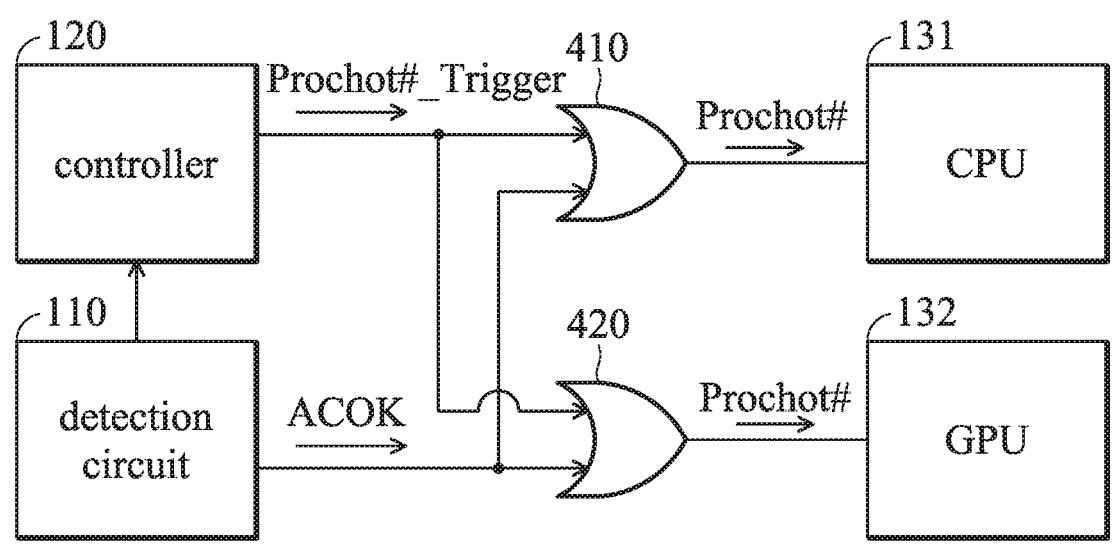
FIG. 4 is a schematic diagram of generating the throttling signal Prochot # according to an embodiment of the invention.

As shown in FIG. 1, the controller 120 is coupled to the detection circuit 110 and the processing device 130. According to an embodiment of the invention, the controller 120 may be an embedded controller (EC) comprising circuitry, but the invention should not be limited thereto. The controller 120 is configured to perform the power management of the system loading detecting device 100. In addition, according to an embodiment of the invention, the processing device may comprise a central processing unit (CPU) 131 and a graphics processing unit (GPU) 132 (as shown in FIG. 4).

According to the embodiments of the invention, when the system loading detecting device 100 obtain the power through an adapter 200 which is coupled to an alternating current (AC) power source, the system loading detecting device 100 may be operated in an AC operation mode. When the system loading detecting device 100 obtain the power through its battery 140 (i.e. the adapter 200 is unplugged from the system loading detecting device 100), the system loading detecting device 100 may be operated in a direct current (DC) operation mode.

According to an embodiment of the invention, the detection circuit 110 may detect the adapter 200 is unplugged from the system loading detecting device 100 to generate a detection signal ACOK, and the detection circuit 110 may transmit the detection signal ACOK to the controller 120. When the system loading detecting device 100 is switched from the AC operation mode to the DC operation mode (i.e. the adapter 200 is unplugged from the system loading detecting device 100), the detection signal ACOK generated by the detection circuit 110 may be changed from a first level (e.g. a high level) to a second level (e.g. a low level). When the system loading detecting device 100 is switched from the DC operation mode to the AC operation mode (i.e. the adapter 200 is re-plugged into the system loading detecting device 100), the detection signal ACOK generated by the detection circuit 110 may be changed from the second level (e.g. a low level) to the first level (e.g. a high level). Therefore, after the detection signal ACOK is transmitted to the controller 120, the controller 120 may know whether the adapter 200 is plugged into the system loading detecting device 100 according to the detection signal ACOK.

Figure 2:
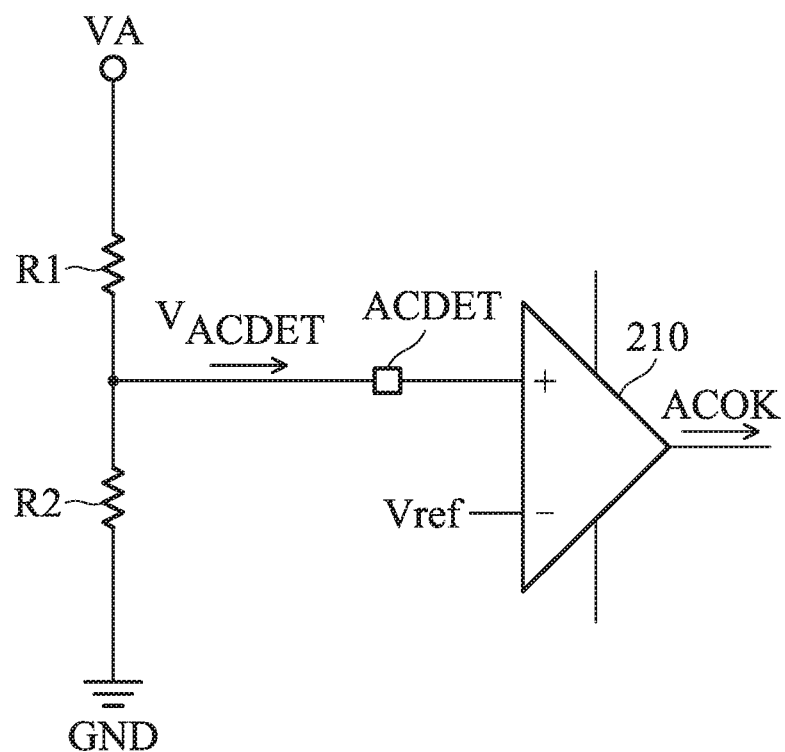
FIG. 2 is a circuit diagram of the detection circuit 110 according to an embodiment of the invention.

FIG. 2 is a circuit diagram of the detection circuit 110 according to an embodiment of the invention. As shown in FIG. 2, the detection circuit 110 may comprise a first resistor R1, a second resistor R2 and a comparator 210. One end of the first resistor R1 may receive the system power source VA (i.e. the positive voltage of the system power source), and the other end of the first resistor R1 may be coupled to the second resistor R2 and the comparator 210. In the embodiment of the invention, when the system loading detecting device 100 obtains the power from the adapter 200, the system power source VA may be regarded as the voltage of the DC end of the adapter 200. One end of the second resistor R2 may be coupled to the first resistor R1 and the comparator 210, and the other end of the second resistor R2 may be coupled to a ground GND (i.e. the negative voltage of the system power source). One input end (i.e. end point ACDET) of the comparator 210 may receive the divided voltage signal VACDET (i.e. the divided voltage) between the first resistor R1 and the second resistor R2, and the other input end of the comparator 210 may receive a reference voltage Vref. The comparator 210 may compare the divided voltage signal VACDET to the reference voltage Vref to generate the detection signal ACOK and transmit the detection signal ACOK to the controller 120. In the embodiment, when the system loading detecting device 100 obtains the power from the adapter 200, the divided voltage signal VACDET may be higher than the reference voltage Vref. Therefore, when the divided voltage signal VACDET is higher than the reference voltage Vref, the detection signal ACOK generated by the comparator 210 may be at the first level (e.g. a high level). Further, when the adapter 200 is unplugged from the system loading detecting device 100, because the system power source VA is reduced, the divided voltage signal VACDET will be lower than the reference voltage Vref. Therefore, when the divided voltage signal VACDET is lower than the reference voltage Vref, the detection signal ACOK generated by the comparator 210 may be at the second level (e.g. a low level).

According to an embodiment of the invention, when the controller 120 knows that the detection signal ACOK is at the second level, the controller 120 may determine that the adapter 200 has been unplugged from the system loading detecting device 100. Therefore, the controller 120 may generate a throttling signal Prochot # to enable a throttling mechanism to prevent the system loading detecting device 100 from shutting down due to the power shortage. When the system loading detecting device 100 is in the throttling mechanism, the processing device 130 (e.g. the CPU 131 and the GPU 132 of FIG. 4) of the system loading detecting device 100 may perform underclocking operation to reduce the system loading of the system loading detecting device 100. Details for generating the throttling signal Prochot # are discussed below based on FIG. 4.

Figure 3A:
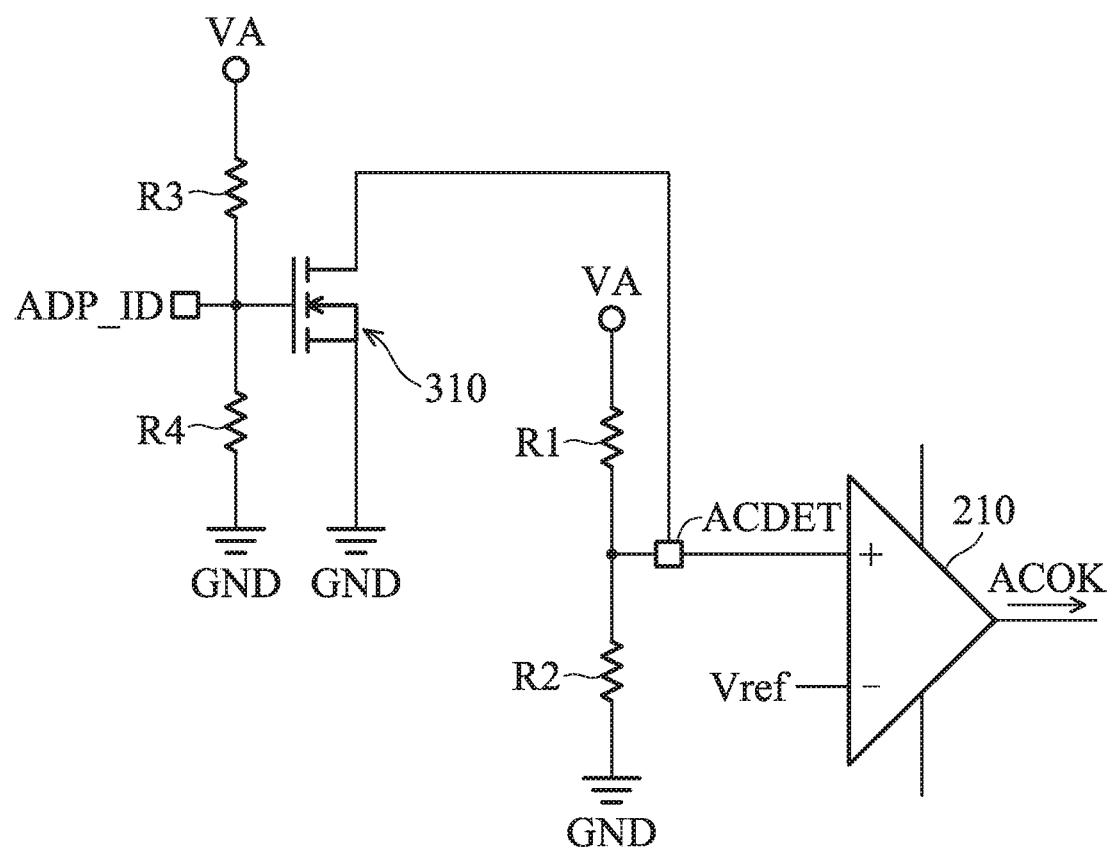
FIG. 3A is a circuit diagram of the detection circuit 300 according to an embodiment of the invention.
Figure 3B:
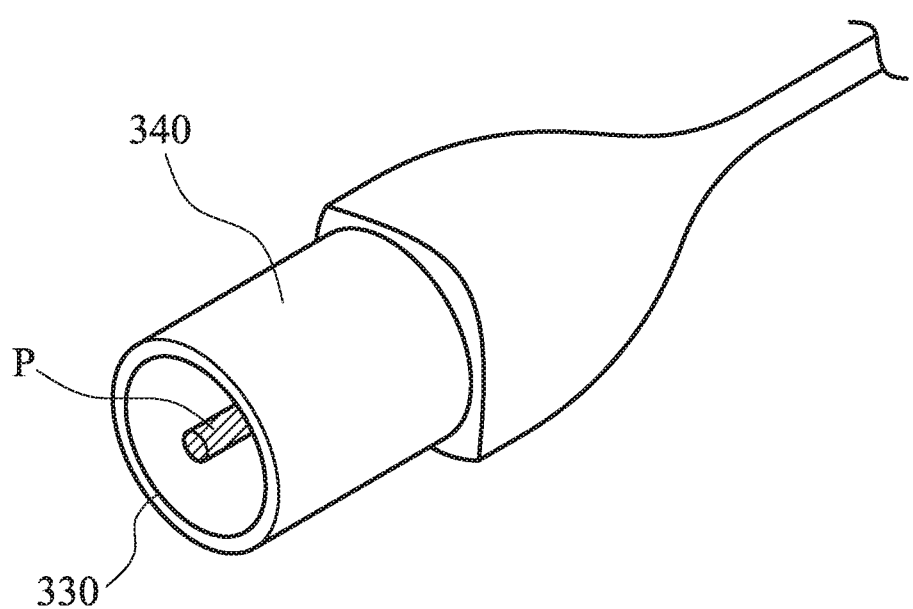
FIG. 3B is a schematic diagram of the connector of the DC end of the adapter 200 according to an embodiment of the invention.

Generally speaking, there are two methods for unplugging the adapter 200 from the system loading detecting device 100. One method is for the adapter 200 to be unplugged from the AC end (i.e. the end coupled to the AC power source) of the adapter 200, and the other method is for the adapter 200 to be unplugged from the DC end (i.e. the end coupled to the system loading detecting device 100) of the adapter 200. However, when the adapter 200 is unplugged from the system loading detecting device 100 through its DC end, the system power source VA may drop quickly, and as a result, the system loading detecting device 100 may not enable the throttling mechanism in time. Therefore, when the adapter 200 is unplugged from the system loading detecting device 100 through its DC end, in order to make the system loading detecting device 100 be able to promptly detect that the adapter 200 is unplugged from the system loading detecting device 100, in an embodiment of the invention, another circuit design for the detection circuit 110 will be provided. FIGS. 3A-3B are used in the example below.

FIG. 3A is a circuit diagram of the detection circuit 300 according to an embodiment of the invention. In the embodiment, the detection circuit 110 may further comprise the detection circuit 300. The detection circuit 300 may be coupled to the end point ACDET of the detection circuit 110 shown in FIG. 2 to determine whether to generate the detection signal ACOK. As shown in FIG. 3, the detection circuit 300 may comprise a third resistor R3, a fourth resistor R4, an identified pin (ID pin) connection end ADP_ID, and a switch 310. One end of the third resistor R3 may receive the system power source VA (i.e. the positive voltage of the system power source), and the other end of the resistor R3 may be coupled to the ID pin connection end ADP_ID, the fourth resistor R4 and switch 310. One end of the fourth resistor R4 may be coupled to the ID pin connection end ADP_ID, the third resistor R3 and switch 310, and the other end of the fourth resistor R4 may be coupled to a ground GND (i.e. the negative voltage of the system power source). According to an embodiment of the invention, the switch 310 may be an N-type field-effect transistor (FET). The drain of the switch 310 may be coupled to the end point ACDET of the detection circuit 110.

FIG. 3B is a schematic diagram of the connector of the DC end of the adapter 200 according to an embodiment of the invention. As shown in FIG. 3B, the metal outer ring 340 of the connector of the DC end of the adapter 200 is coupled the ground end (i.e. ground GND) of the system loading detecting device 100 and the metal inner ring 330 of the connector of the DC end of the adapter 200 is coupled a connection end where the system loading detecting device 100 receiving the system power source VA. In addition, the connector of the DC end of the adapter 200 may comprise an ID pin P, and the electronic property of the ID pin P corresponds to the ground GND. When the DC end of the adapter 200 is plugged into the system loading detecting device 100, during the connector of the DC end of the adapter 200 is completely connected to the circuit board of the system loading detecting device 100, the ID pin P of the connector is the last part of connecting to the system loading detecting device 100. In addition, When the DC end of the adapter 200 is unplugged from the system loading detecting device 100, the ID pin P of the connector is the first part of leaving from the system loading detecting device 100. Therefore, before the ID pin P of the connector touches the ID pin connection end ADP_ID, the metal inner ring 330 of the connector of the DC end of the adapter 200 may first touch the connection end where the system loading detecting device 100 receiving the system power source VA to provide the system power source VA to the system loading detecting device 100. In addition, in the embodiment, before the ID pin P of the connector touches the ID pin connection end ADP_ID, the switch 310 may be enabled (i.e. the transistor is enabled) by the divided voltage signal which is generated by the system power source VA passing through the third resistor R3 and the fourth resistor R4. Because the switch 310 is enabled, the end point ACDET may be connected to the ground GND. When the end point ACDET is connected to the ground GND, the detection circuit 110 shown in FIG. 2 will not generate the detection signal ACOK. After the ID pin P of the connector touches the ID pin connection end ADP_ID, the ID pin connection end ADP_ID will be connected to the ground GND, therefore, the switch 310 may be disabled (i.e. the transistor is disabled). After the switch 310 is disabled, the end point ACDET may not be influenced by the switch 310. Therefore, the divided voltage signal VACDET shown in FIG. 2 may be transmitted to the comparator 210 from the end point ACDET, and as description for FIG. 2 above, the comparator 210 may compare divided voltage signal VACDET and the reference voltage Vref to generate the detection signal ACOK and transmit the detection signal ACOK to the controller 120.

As illustrated above, in the embodiment of the invention, when the adapter 200 is unplugged from the system loading detecting device 100, the ID pin P of the connector is the first part of leaving from the system loading detecting device 100. Therefore, when the ID pin P of the connector is unplugged from the system loading detecting device 100, the switch 310 is enabled, the end point ACDET will be connected to the ground GND to make the state of the detection signal ACOK can be changed quickly (from high level to low level).

FIG. 4 is a schematic diagram of generating the throttling signal Prochot # according to an embodiment of the invention. As shown in FIG. 4, the detection circuit 110 and the controller 120 may further be coupled to the input ends of a first OR gate 410 and a second OR gate 420. The output end of the first OR gate 410 is coupled to the CPU 131 and the output end of the second OR gate 420 is coupled to the GPU 132. In the embodiment, when the adapter 200 is unplugged from the system loading detecting device 100, the system loading detecting device 100 may generate a low level detection signal ACOK (i.e. logical level=0). When the detection signal ACOK generated by the detection circuit 110 is at a low level, the controller 120 may generate a low level trigger signal Prochot #_Treigger (i.e. logical level=0). When the first OR gate 410 and the second OR gate 420 receive the low level detection signal ACOK and the low level trigger signal Prochot #_Treigger, the first OR gate 410 and the second OR gate 420 may generate the low level throttling signal Prochot # (i.e. logical level=0) and transmit the low level throttling signal Prochot # to the CPU 131 and the GPU 132 to enable the throttling mechanism. Therefore, after the CPU 131 and the GPU 132 receive the low level throttling signal Prochot #, the CPU 131 and the GPU 132 may perform the underclocking operation to reduce the system loading of the system loading detecting device 100.

According to an embodiment of the invention, the controller 120 may be coupled to a system voltage sensor (not shown in figures) and a system current sensor (not shown in figures). The controller may calculate system power according to the voltage sampling value obtained from the system voltage sensor and the current sampling value obtained from the system current sensor (i.e. P=IV).

Figure 5:
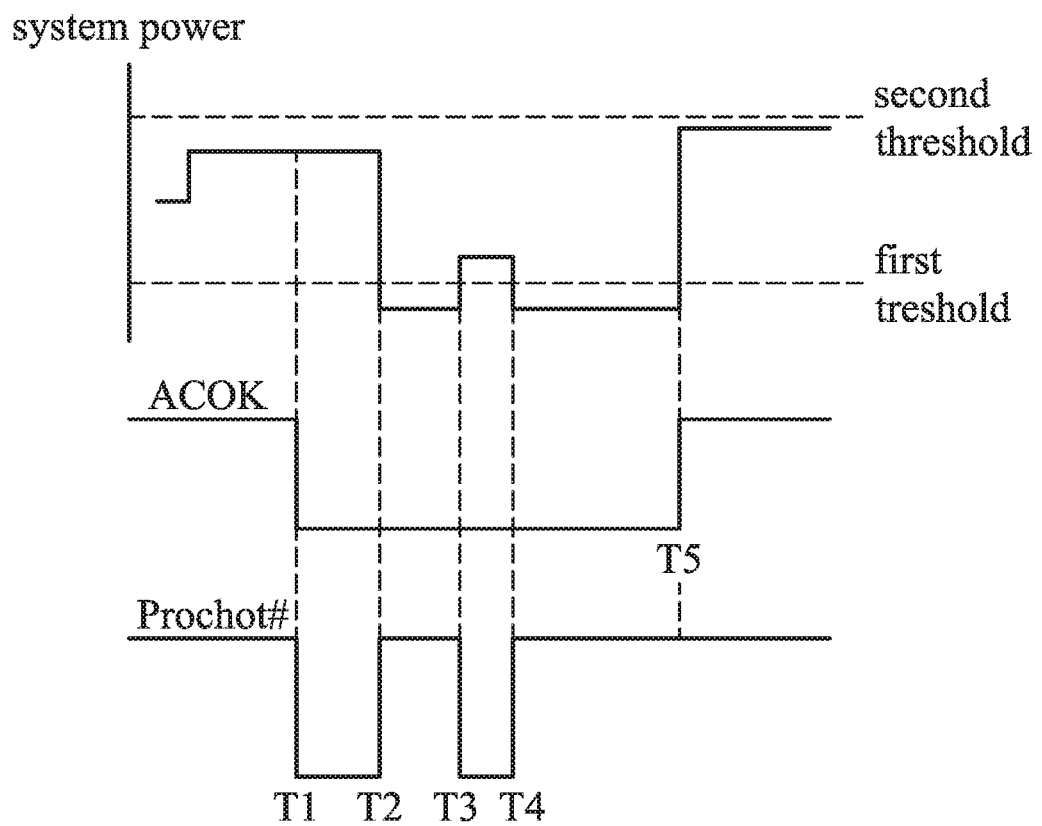
FIG. 5 is a schematic diagram of enabling or disabling the throttling mechanism based on the system power according to an embodiment of the invention.

According to an embodiment of the invention, when the system loading detecting device 100 is switched from the AC operation mode to the DC operation mode and enters a throttling mechanism, the controller 120 may determine whether the current system power of the system loading detecting device 100 is greater than a first threshold corresponding to the DC operation mode to determine whether to suspend the throttling mechanism. When the current system power of the system loading detecting device 100 is not greater than the first threshold corresponding to the DC operation mode, the controller 120 may suspend the throttling mechanism. That is to say, when the current system power of the system loading detecting device 100 is not greater than the threshold corresponding to the DC operation mode, the processing device 130 (i.e. the CPU 131 and the GPU 132) will not perform the underclocking operation. FIG. 5 is taken for illustration below.

According to another embodiment of the invention, when the system loading detecting device 100 is operated in the AC operation mode, the controller 120 may determine whether the current system power of the system loading detecting device 100 is greater than a second threshold corresponding to the AC operation mode to determine whether to enable the throttling mechanism.

FIG. 5 is a schematic diagram of enabling or disabling the throttling mechanism based on the system power according to an embodiment of the invention. As shown in FIG. 5, at time point T1, the detection signal ACOK is changed from high level to low level, i.e. the adapter 200 is unplugged from the system loading detecting device 100. Therefore, the throttling signal Prochot # may be changed from high level to low level (the throttling mechanism is enabled), and the controller 120 may take the first threshold to be the determination basis. In the time duration T2~T3, the controller 120 determine the system power is lower than the first threshold corresponding to the DC operation mode. Therefore, the throttling signal Prochot # may be changed from low level to high level (the throttling mechanism is suspended). In the time duration T3~T4, the controller 120 determine the system power is greater than the first threshold corresponding to the DC operation mode. Therefore, the throttling signal Prochot # may be changed from high level to low level (the throttling mechanism is enabled again). In the time duration T4~T5, the controller 120 determine the system power is lower than the first threshold corresponding to the DC operation mode again. Therefore, the throttling signal Prochot # may be changed from a low level to a high level (the throttling mechanism is suspended). After time point T5, the detection signal ACOK is changed from a low level to a high level, i.e. the adapter 200 is plugged into the system loading detecting device 100. Therefore, the controller 120 may take the second threshold to be the determination basis, and determine whether the current system power is greater than the second threshold corresponding to AC operation mode to determine whether to enable the throttling mechanism.

Figure 6A:
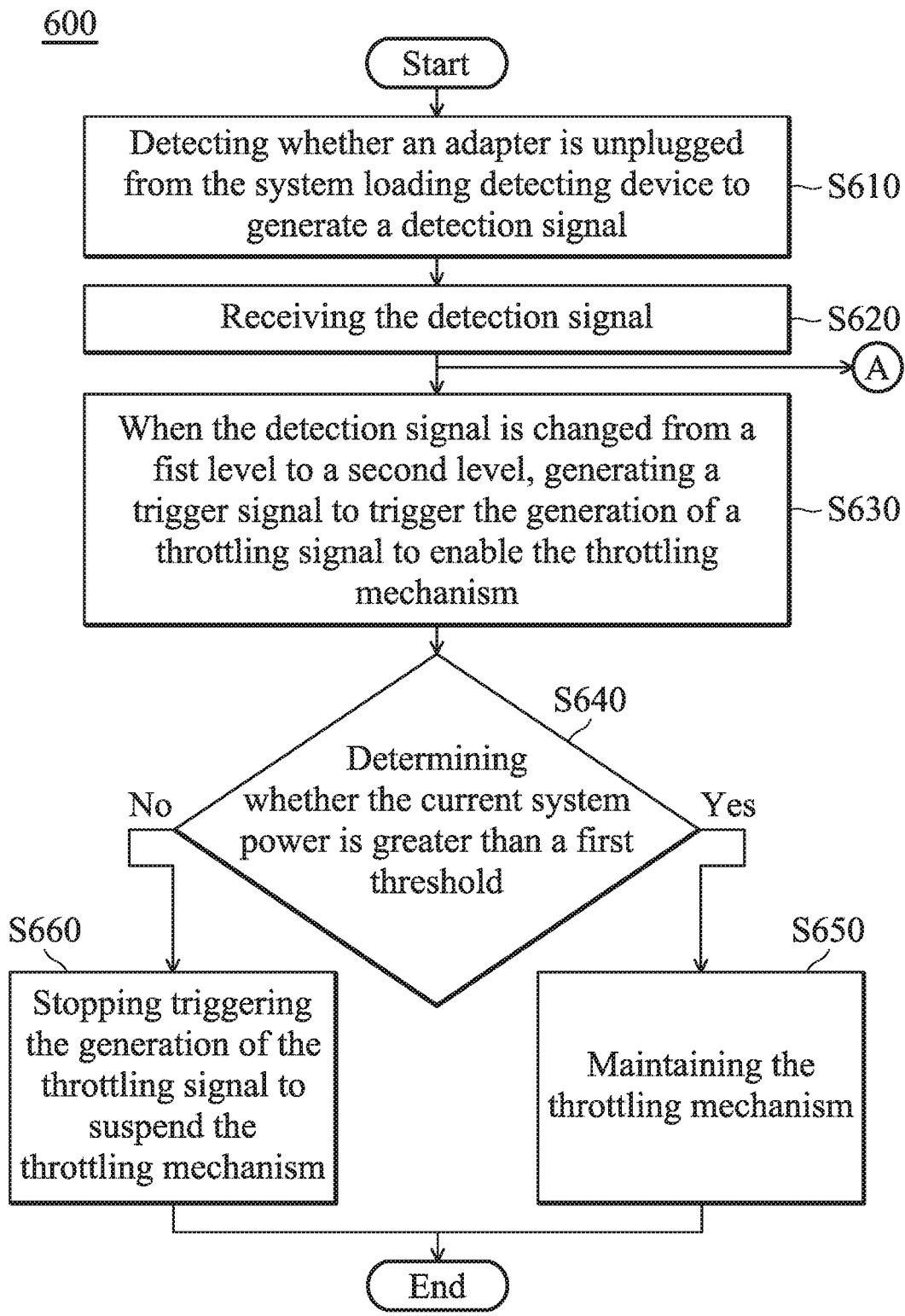
FIG. 6A-6B is a flow chart 600 illustrating the system loading detecting method according to an embodiment of the invention.
Figure 6B:
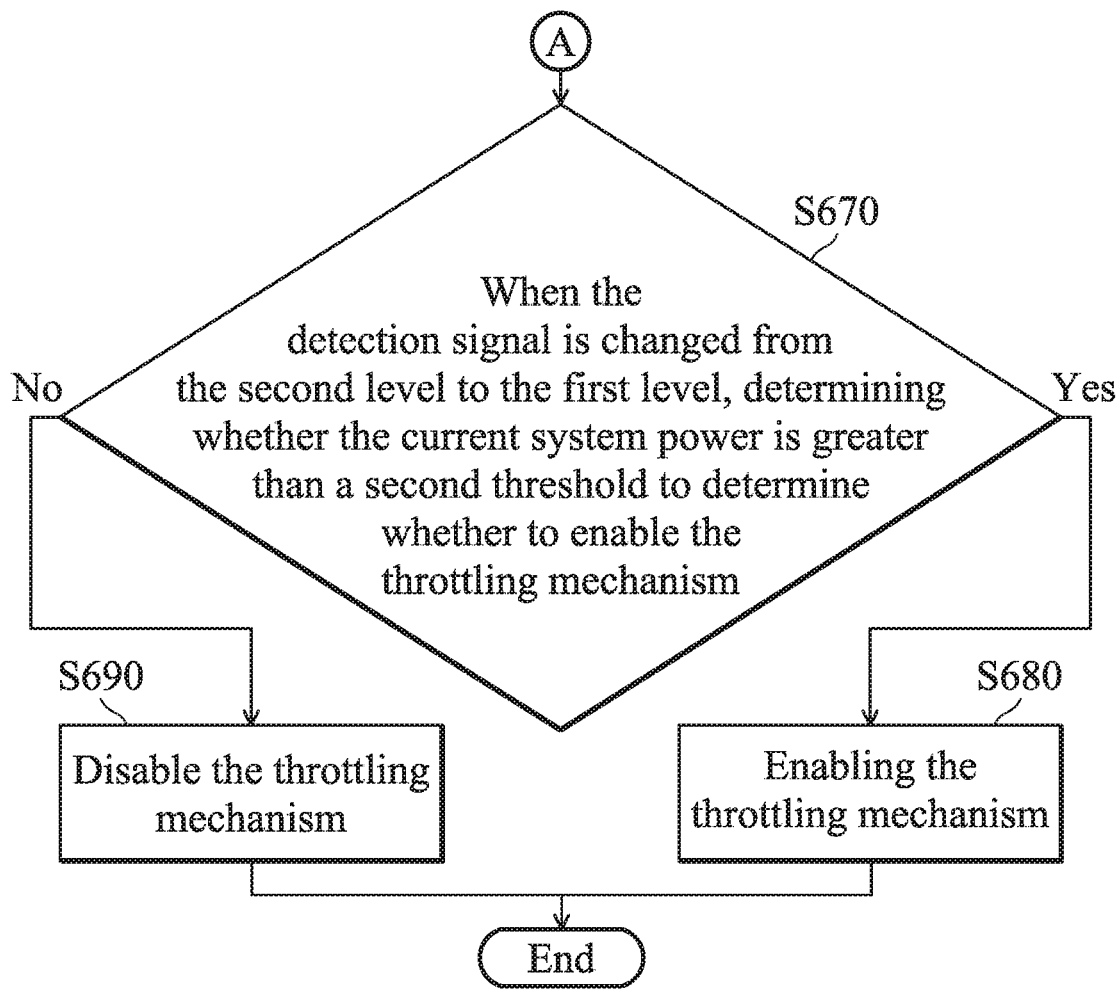

FIG. 6A-6B is a flow chart 600 illustrating the system loading detecting method according to an embodiment of the invention. The system loading detecting method is applicable to the system loading detecting device 100. In step S610, a detection device of the system loading detecting device 100 detects whether an adapter is unplugged from the system loading detecting device 100 to generate a detection signal ACOK. In step S620, a controller of the system loading detecting device 100 receives the detection signal ACOK. In step S630, when the detection signal ACOK is changed from a first level to a second level, the controller of the system loading detecting device 100 may generate a trigger signal Prochot #_Treigger to trigger the generation of a throttling signal Prochot # to enable the throttling mechanism.

In step S640, the controller of the system loading detecting device 100 may determine whether the current system power is greater than a first threshold. When the current system power is greater than the first threshold, step S650 is performed. In step S650, the controller of the system loading detecting device 100 may maintain the throttling mechanism. When the current system power is not greater than the first threshold, step S660 is performed. In step S660, the controller of the system loading detecting device 100 stops triggering the generation of the throttling signal Prochot # to suspend the throttling mechanism.

In step S670, when the detection signal ACOK is changed from the second level to the first level, the controller of the system loading detecting device 100 may take the second threshold to be the determination basis, and determine whether the current system power is greater than the second threshold corresponding to AC operation mode to determine whether to enable the throttling mechanism. When the system power is greater than the second threshold, step S680 is performed. In step S680, the controller of the system loading detecting device 100 may enable the throttling mechanism. When the system power is not greater than the second threshold, step S690 is performed. In step S690, the controller of the system loading detecting device 100 may not enable the throttling mechanism.

According to an embodiment of the invention, the system loading detecting method further comprises that a comparator of the detection circuit of the system loading detecting device 100 may compare the divided voltage generated through a first resistor and a second resistor to a reference voltage Vref to generate the detection signal ACOK.

According to an embodiment of the invention, the system loading detecting method further comprises that the detection circuit of the system loading detecting device 100 may detect an IP ping of the DC end of the adapter is unplugged from the system loading detecting device 100. When the IP ping has been unplugged from the system loading detecting device 100, the detection signal ACOK is changed from the first level to the second level to reduce the system loading.

According to the system loading detecting method provided in the embodiments of the invention, when the adapter is unplugged from the system loading detecting device 100, according to the detection signal ACOK generated by the detection circuit of the system loading detecting device 100, the controller of the system loading detecting device 100 may promptly trigger the generation of the throttling signal Prochot # to enable the throttling mechanism to reduce the system loading. Therefore, according to the system loading detecting method provided in the embodiments of the invention, when the adapter is unplugged from the system loading detecting device 100, the controller of the system loading detecting device 100 can more quickly know that the adapter is unplugged from the system loading detecting device 100. Therefore, the system loading detecting method provided in the embodiments of the invention can avoid that the system may be shut down due to the power shortage and avoid the battery overload. In addition, according to the system loading detecting method provided in the embodiments of the invention, the system loading detecting device 100 can determine whether to suspend the throttling mechanism according to current system power. Therefore, the power management of the system loading detecting device 100 can be adjusted flexibly.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A system loading detecting device, comprising:
    a processing device;
    a detection circuit, detecting whether an adapter is unplugged from the system loading detecting device to generate a detection signal, wherein when the adapter is unplugged from the system loading detecting device, the detection signal is changed from a first level to a second level; and
    an embedded controller coupled to the detection circuit and the processing device, wherein the embedded controller is programmed to receive the detection signal and to determine whether to trigger generation of a throttling signal according to the detection signal to enable a throttling mechanism to reduce system loading, wherein the detection circuit further comprises:
    a first resistor;
    a second resistor;
    a comparator, coupled to the first resistor and the second resistor, and comparing a divided voltage generated through the first resistor and the second resistor to a reference voltage to generate the detection signal;
    a third resistor;
    a fourth resistor;
    an ID pin connection end; and
    a switch, coupled to the third resistor, the fourth resistor and the ID pin connection end, wherein the comparator is coupled to the switch at an end point, and when the switch is disabled, the comparator compares the divided voltage generated through the first resistor and the second resistor to the reference voltage to generate the detection signal.

2. The system loading detecting device of claim 1, wherein when the detection signal is at the second level, the embedded controller is programmed to generate a trigger signal to trigger the generation of the throttling signal to enable the throttling mechanism.

3. The system loading detecting device of claim 2, wherein while the throttling mechanism is enabled, the embedded controller is programmed to determine whether current system power is greater than a threshold, wherein when the current system power is greater than the threshold, the embedded controller is programmed to maintain the throttling mechanism, and when the current system power is lower than the threshold, the embedded controller is programmed to stop triggering the generation of the throttling signal to suspend the throttling mechanism.

4. A system loading detecting method, applied to a system loading detecting device, comprising:
    detecting, by a detection circuit of the system loading detecting device, whether an adapter is unplugged from the system loading detecting device to generate a detection signal;
    receiving, by an embedded controller of the system loading detecting device, the detection signal; and
    determining whether to trigger generation of a throttling signal according to the detection signal to enable a throttling mechanism to reduce system loading,
    wherein when the adapter is unplugged from the system loading detecting device, the detection signal is changed from a first level to a second level, wherein the detection circuit comprises a first resistor, a second resistor, a comparator, a third resistor, a fourth resistor, an ID pin connection end, and a switch and the system loading detecting method further comprising:
    determining whether an ID pin of a DC end of the adapter is unplugged from the system loading detecting device to determine to disable or enable the switch, wherein the comparator is coupled to the switch at an end point;
    when the switch is disabled, comparing, by the comparator, a divided voltage generated through the first resistor and the second resistor to a reference voltage to generate the detection signal.

5. The system loading detecting method of claim 4, further comprising:
    when the detection signal is at the second level, generating a trigger signal to trigger the generation of the throttling signal to enable the throttling mechanism.

6. The system loading detecting method of claim 5, further comprising:
    while the throttling mechanism is enabled, determining whether current system power is greater than a threshold;
    when the current system power is greater than the threshold, maintaining the throttling mechanism; and
    when the current system power is lower than the threshold, stopping triggering the generation of the throttling signal to suspend the throttling mechanism.

* * * * *